US012606170B2

(12) United States Patent
Teramachi et al.

(10) Patent No.: US 12,606,170 B2
(45) Date of Patent: Apr. 21, 2026

(54) CONTROL DEVICE

(71) Applicant: HONDA MOTOR CO., LTD., Tokyo (JP)

(72) Inventors: Tomotaka Teramachi, Tokyo (JP); Tatsuya Konishi, Tokyo (JP); Kenta Ishii, Tokyo (JP); Shinichi Okunishi, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 12 days.

(21) Appl. No.: 18/677,914

(22) Filed: May 30, 2024

(65) Prior Publication Data

US 2024/0400056 A1 Dec. 5, 2024

(30) Foreign Application Priority Data

May 31, 2023 (JP) ................................ 2023-090186

(51) Int. Cl.
B60W 30/18 (2012.01)
B60W 50/12 (2012.01)

(52) U.S. Cl.
CPC ...... B60W 30/18163 (2013.01); B60W 50/12 (2013.01); B60W 2420/403 (2013.01); (Continued)

(58) Field of Classification Search
CPC .......... B60W 30/18163; B60W 50/12; B60W 2554/40; B60W 2420/403; (Continued)

(56) References Cited

U.S. PATENT DOCUMENTS 11,667,295 B2 * 6/2023 Pyo ........................ B60W 40/04
382/104
12,190,734 B2 * 1/2025 Kang ..................... G08G 1/167
(Continued)

FOREIGN PATENT DOCUMENTS

JP 4366419 B2 11/2009
JP 2019-001183 A 1/2019
JP 2022-118036 A 8/2022

OTHER PUBLICATIONS

Dec. 24, 2024, Translation of Japanese Office Action issued for related JP Application No. 2023-090186.

*Primary Examiner* — Hai H Huynh
*Assistant Examiner* — Johnny H Hoang
(74) *Attorney, Agent, or Firm* — Paratus Law Group, PLLC

(57) ABSTRACT

A control device has a lane change function to execute lane change control of changing a lane in which a moving object travels. In a case where a lane change function is enabled, a travel control unit of the control device restricts, in response to it being estimated that another moving object is present in a specific region in which accuracy of detecting an object by an external sensor is relatively lower, execution of the lane change control. The travel control unit releases, in response to a state in which it is estimated that the other moving object is present in the specific region being eliminated after the execution of the lane change control is restricted, restriction placed on the lane change control, and disables the lane change function in response to the state continuing for a predetermined time after the execution of the lane change control is restricted.

5 Claims, 13 Drawing Sheets

(52) U.S. Cl.
CPC ... *B60W 2420/408* (2024.01); *B60W 2554/40*
(2020.02); *B60W 2556/20* (2020.02)

(58) Field of Classification Search
CPC ....... B60W 2420/408; B60W 2556/20; B60W
30/02; B60W 30/045; B60W 30/09;
B60W 40/09; B60W 40/10; B60W
40/112; B60W 40/114; B60W 2552/30;
B60W 2520/00; B60W 2520/14; B60W
2520/18
USPC ......................................... 701/37–44, 71–81
See application file for complete search history.

(56)                        References Cited

U.S. PATENT DOCUMENTS

| | | | |
|---|---|---|---|
| 2009/0088925 A1 | 4/2009 | Sugawara et al. | |
| 2018/0354510 A1 | 12/2018 | Miyata | |
| 2021/0402999 A1* | 12/2021 | Park ................. | B60W 50/0098 |
| 2022/0055481 A1 | 2/2022 | Shimizu et al. | |
| 2022/0063722 A1* | 3/2022 | Omikawa ......... | B60W 50/0097 |

* cited by examiner

LANE CHANGE FUNCTION: ENABLED
RELEASE RESTRICTION ON
LANE CHANGE CONTROL

L1

L2

CONTROL DEVICE

This application is based upon and claims the benefit of priority from prior Japanese patent application No. 2023-90186, filed on May 31, 2023, the entire contents of which are incorporated herein by reference.

TECHNICAL FIELD

The present disclosure relates to a control device capable of executing lane change control of a moving object.

BACKGROUND ART

In recent years, active efforts have been made to provide access to a sustainable transportation system in consideration of vulnerable people among traffic participants. In order to implement the above object, research and development for further improving traffic safety and convenience through research and development related to driving assistance technology and self-driving technology have been focused on.

As an example of the driving assistance technology, JP4366419B discloses a travel assistance device capable of executing control for supporting a lane change. The travel assistance device of JP4366419B includes a camera and a sensor such as a laser radar or a millimeter wave radar, and performs travel assistance by recognizing the outside.

SUMMARY

Around a moving object such as a vehicle, a specific region in which accuracy of detecting an object by an external sensor is relatively lower as compared with other regions may exist. When such a specific region exists, a state in which it is difficult for the control device to determine whether lane change control is executable may continue, and there is a room for improvement.

Aspects of the present disclosure relate to providing a control device for a moving object capable of preventing a state, in which it is difficult to determine whether lane change control is executable, from continuing for a long time even when a specific region exists in which accuracy of detecting an object by an external sensor is relatively lower as compared with other regions.

According to an aspect of the present disclosure, there is provided a control device having a lane change function to execute lane change control of changing a lane in which a moving object travels, the moving object including an external sensor configured to detect an object around the moving object, the control device including:

a recognition unit configured to recognize a surrounding situation of the moving object based on a detection result of the external sensor;

an estimation unit configured to estimate, based on the surrounding situation recognized by the recognition unit, whether another moving object is present in a specific region in which accuracy of detecting the object by the external sensor is relatively lower as compared with that in other regions; and a travel control unit configured to execute the lane change control based on the surrounding situation recognized by the recognition unit and an estimation result of the estimation unit, in which the lane change function is switchable to be enabled or disabled in response to an instruction from an occupant of the moving object, the lane change control is executable when the lane change function is enabled, and the lane change control is not executable when the lane change function is disabled, and in a case where the lane change function is enabled, the travel control unit is configured to restrict, in response to the estimation unit estimating that the other moving object is present in the specific region, execution of the lane change control, release, in response to a state in which it is estimated that the other moving object is present in the specific region being eliminated after the execution of the lane change control is restricted, restriction placed on the lane change control, and disable the lane change function in response to the state in which it is estimated that the other moving object is present in the specific region continuing for a predetermined time after the execution of the lane change control is restricted.

According to an aspect of the present disclosure, a state in which it is difficult to determine whether the lane change control is executable may be prevented from continuing for a long time even when a specific region exists. This may contribute to development of a sustainable transportation system.

BRIEF DESCRIPTION OF DRAWINGS

Exemplary embodiment(s) of the present invention will be described in detail based on the following figures, wherein:

FIG. 10 is a flowchart showing an example of processing executed by the control device 100 when a presence flag of another vehicle in at least one of a right difficult-to-detect region 420R and a left difficult-to-detect region 420L is set to be ON;

DESCRIPTION OF EMBODIMENTS

Hereinafter, a control device for a moving object according to an embodiment of the present disclosure will be described with reference to the accompanying drawings.
(Overall Configuration of Vehicle System)

Figure 1:
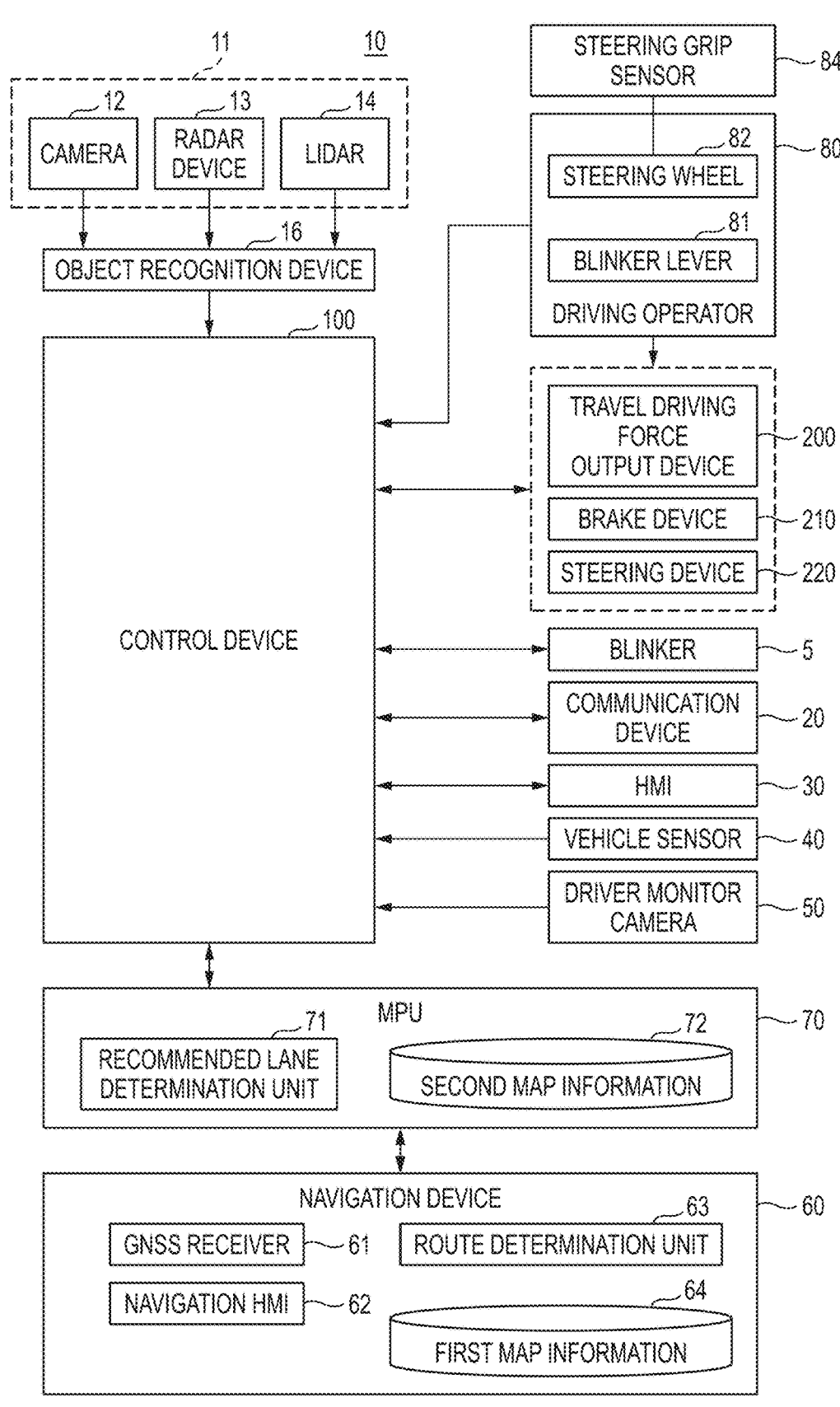
FIG. 1 is a block diagram showing an overall configuration of a vehicle system 10 mounted on a vehicle 1.
Figure 3:
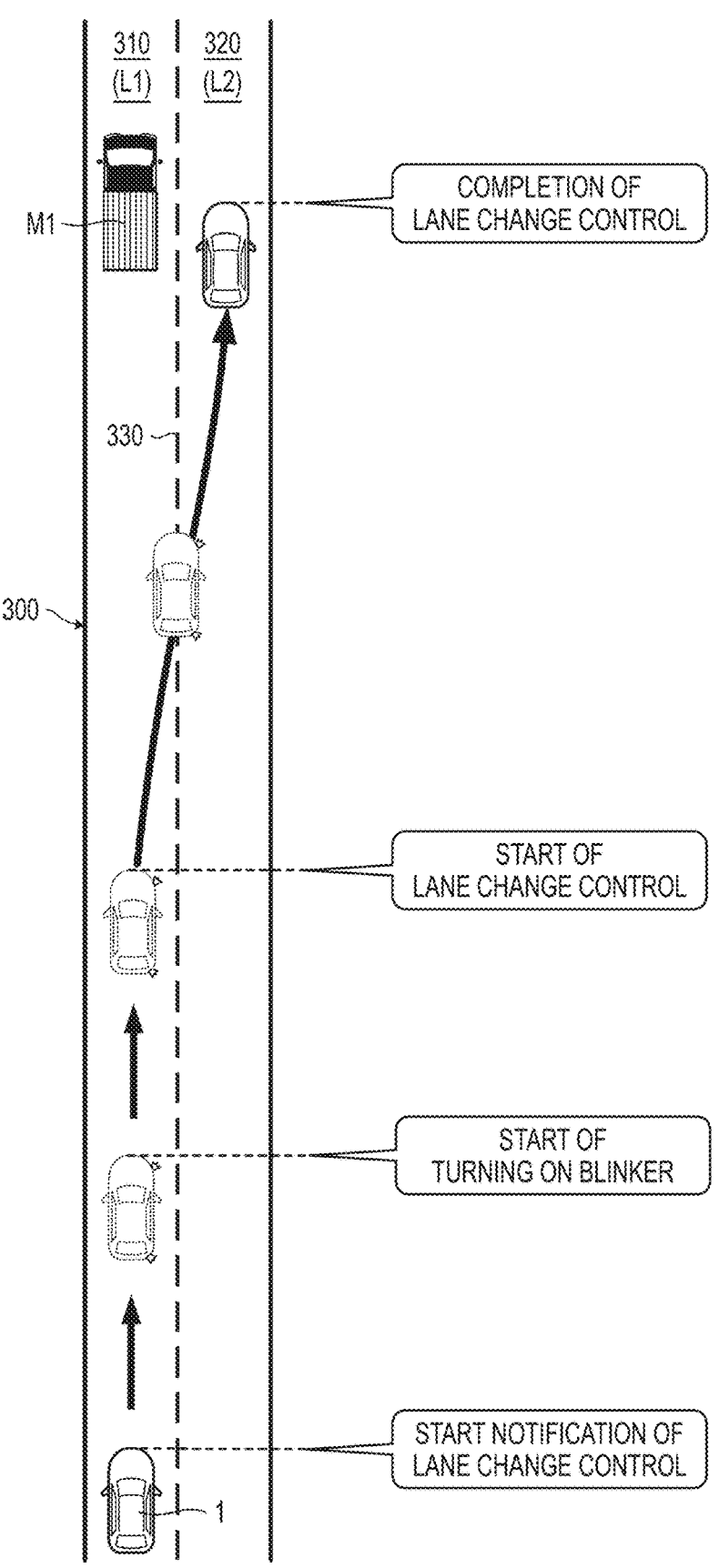
FIG. 3 is a diagram showing an example of a lane change operation of the vehicle 1 under lane change control.

FIG. 1 is a block diagram showing an overall configuration of a vehicle system 10 mounted on a vehicle 1 (see FIG. 3). The vehicle 1 is, for example, a vehicle such as a two-wheeled vehicle, a three-wheeled vehicle, or a four-wheeled vehicle, and a drive source thereof is an internal combustion engine such as a diesel engine or a gasoline engine; an electric motor; or a combination thereof. The electric motor operates using electric power generated by an electrical generator connected to the internal combustion engine or electric power discharged from a secondary battery or a fuel cell.

The vehicle system 10 includes, for example, an external sensor 11, an object recognition device 16, a communication device 20, a human machine interface (HMI) 30, a vehicle sensor 40, a driver monitor camera 50, a navigation device 60, a map positioning unit (MPU) 70, a driving operator 80, a control device 100, a travel driving force output device 200, a brake device 210, and a steering device 220. These devices are connected to each other by a multiplex communication line such as a controller area network (CAN) communication line, a serial communication line, or a wireless communication network.

The external sensor 11 detects an object around the vehicle 1. The external sensor 11 includes a camera 12, a radar device 13, and a light detection and ranging (LIDAR) 14.

The camera 12 is, for example, a digital camera using an imaging device such as a charge coupled device (CCD) or a complementary metal oxide semiconductor (CMOS). The camera 12 is attached at any postilion on the vehicle 1.

The radar device 13 emits radio waves such as millimeter waves to surroundings of the vehicle 1, and detects radio waves (reflected waves) reflected by an object to detect at least a position (distance and orientation) of the object. The radar device 13 is attached at any position on the vehicle 1.

The LIDAR 14 emits light (or an electromagnetic wave having a wavelength close to that of light) around the vehicle 1 and measures scattered light. The LIDAR 14 detects a distance to a target based on a time elapsed from light emission to light reception. The emitted light is, for example, pulsed laser light. The LIDAR 14 is attached at any postilion on the vehicle 1.

The object recognition device 16 performs sensor fusion processing on some or all of detection results of the camera 12, the radar device 13, and the LIDAR 14 to recognize a position, a type, a speed, and the like of an object. The object recognition device 16 outputs a recognition result to the control device 100. The object recognition device 16 may output the detection results of the camera 12, the radar device 13, and the LIDAR 14 to the control device 100 as they are.

The communication device 20 uses, for example, a cellular network, a Wi-Fi (registered trademark) network, Bluetooth (registered trademark), or dedicated short range communication (DSRC) to communicate with other vehicles present in the surroundings of the vehicle 1 or communicate with various server devices via a radio base station.

The HMI 30 presents various types of information to the occupant of the vehicle 1 and receives an input operation from the occupant. The HMI 30 includes various types of display devices, a speaker, a buzzer, a touch panel, a switch, keys, and the like. The HMI 30 is an example of the reception unit in the present disclosure.

The vehicle sensor 40 includes a speed sensor that detects a travel speed (hereinafter also referred to as a "speed") of the vehicle 1, an acceleration sensor that detects an acceleration, a yaw rate sensor that detects an angular speed around a vertical axis, an azimuth sensor that detects a direction of the vehicle 1, and the like.

The driver monitor camera 50 is, for example, a digital camera using a solid-state imaging device such as a CCD or a CMOS. The driver monitor camera 50 is attached at any position on the vehicle 1 in a position and an orientation in which the head of the occupant (hereinafter, also referred to as a "driver") seated in the driver seat of the vehicle 1 is able to be imaged from the front (that is, in an orientation in which the face is imaged).

The navigation device 60 includes, for example, a global navigation satellite system (GNSS) receiver 61, a navigation HMI 62, and a route determination unit 63. The navigation device 60 stores first map information 64 in a storage device such as a hard disk drive (HDD) or a flash memory.

The GNSS receiver 61 specifies a position of the vehicle 1 based on a signal received from a GNSS satellite. The position of the vehicle 1 may be specified or complemented by an inertial navigation system (INS) using an output of the vehicle sensor 40.

The navigation HMI 62 includes a display device, a speaker, a touch panel, a key, and the like. The navigation HMI 62 may be made common to the HMI 30 partially or entirely.

For example, with reference to the first map information 64, the route determination unit 63 determines a route (hereinafter, also referred to as an "on-map route") from the position of the vehicle 1 specified by the GNSS receiver 61 (or any input position) to a destination input by the occupant using the navigation HMI 62. The first map information 64 is, for example, information in which a road shape is expressed by a link indicating a road and nodes connected by the link. The first map information 64 may include a curvature of a road, point of interest (POI) information, and the like. The on-map route is output to the MPU 70.

The navigation device 60 may perform route guidance using the navigation HMI 62 based on the on-map route. The navigation device 60 may transmit a current position and the destination to a navigation server via the communication device 20 and acquire a route equivalent to the on-map route from the navigation server.

The MPU 70 includes, for example, a recommended lane determination unit 71, and stores second map information 72 in a storage device such as an HDD or a flash memory. The recommended lane determination unit 71 divides the on-map route provided from the navigation device 60 into a plurality of blocks (for example, divides the on-map route by 100 [m] in a vehicle traveling direction), and determines a recommended lane for each block with reference to the second map information 72. For example, the recommended lane determination unit 71 determines which lane from the left is to travel in. When a branching point is present in the on-map route, the recommended lane determination unit 71 determines a recommended lane such that the vehicle 1 may travel along a reasonable route for advancing to a branch destination.

The second map information 72 is map information with higher accuracy than the first map information 64. The second map information 72 includes, for example, information on a center of a lane or information on a boundary of the lane. The second map information 72 may include road information, traffic regulation information, address information, facility information, telephone number information, and the like. The second map information 72 may be updated, as required, by the communication device 20 communicating with another device.

The driving operator 80 includes, for example, an accelerator pedal, a brake pedal, a shift lever, and other operators in addition to a blinker lever 81 and the steering wheel 82. A sensor configured to detect an operation amount or presence or absence of an operation is attached to the driving operator 80, and a detection result thereof is output to some or all of the control device 100, the travel driving force output device 200, the brake device 210, and the steering device 220.

The blinker lever 81 is an operator for turning on (including blinking) or turning off the blinker 5. The control device 100 turns on or off the blinker 5 according to an operation on the blinker lever 81.

The steering wheel 82 is an operator for receiving a steering operation. The steering wheel 82 is not necessarily in an annular shape, and may be in a form of irregular steering, joy stick, button, or the like. A steering grip sensor 84 is attached to the steering wheel 82. The steering grip sensor 84 is implemented by a static capacitance sensor or the like, and outputs, to the control device 100, a signal capable of detecting whether the driver is gripping the steering wheel 82.

The control device 100 is a computer centrally controls the entire vehicle 1, and is implemented by, for example, a hardware processor such as a central processing unit (CPU) executing a program (software). Some or all of these components may be implemented by hardware (including circuitry) such as a large scale integration (LSI), an application specific integrated circuit (ASIC), a field-programmable gate array (FPGA), and a graphics processing unit (GPU), or may be implemented by cooperation of software and hardware. The program may be stored in advance in a storage device such as an HDD or a flash memory of the control device 100. Details of the control device 100 will be described later.

The travel driving force output device 200 outputs, to driving wheels, a travel driving force (torque) for driving the vehicle to travel. The travel driving force output device 200 includes, for example, a combination of an internal combustion engine, an electric motor, a transmission, and the like, and an electronic control unit (ECU) configured to control the combination. The ECU controls the above-described configuration according to information received from the control device 100 or information received from the driving operator 80.

The brake device 210 includes, for example, a brake caliper, a cylinder configured to transmit hydraulic pressure to the brake caliper, an electric motor configured to generate hydraulic pressure in the cylinder, and a brake ECU. The brake ECU controls the electric motor according to the information received from the control device 100 or the information received from the driving operator 80, and outputs a braking torque to each wheel in response to a braking operation.

The steering device 220 includes, for example, a steering ECU and an electric motor. The electric motor changes an orientation of driven wheels, for example, by applying a force to a rack-and-pinion mechanism. The steering ECU drives the electric motor according to the information received from the control device 100 or the information received from the driving operator 80 to change the orientation of the driven wheels.

(Control Device)

Figure 2:
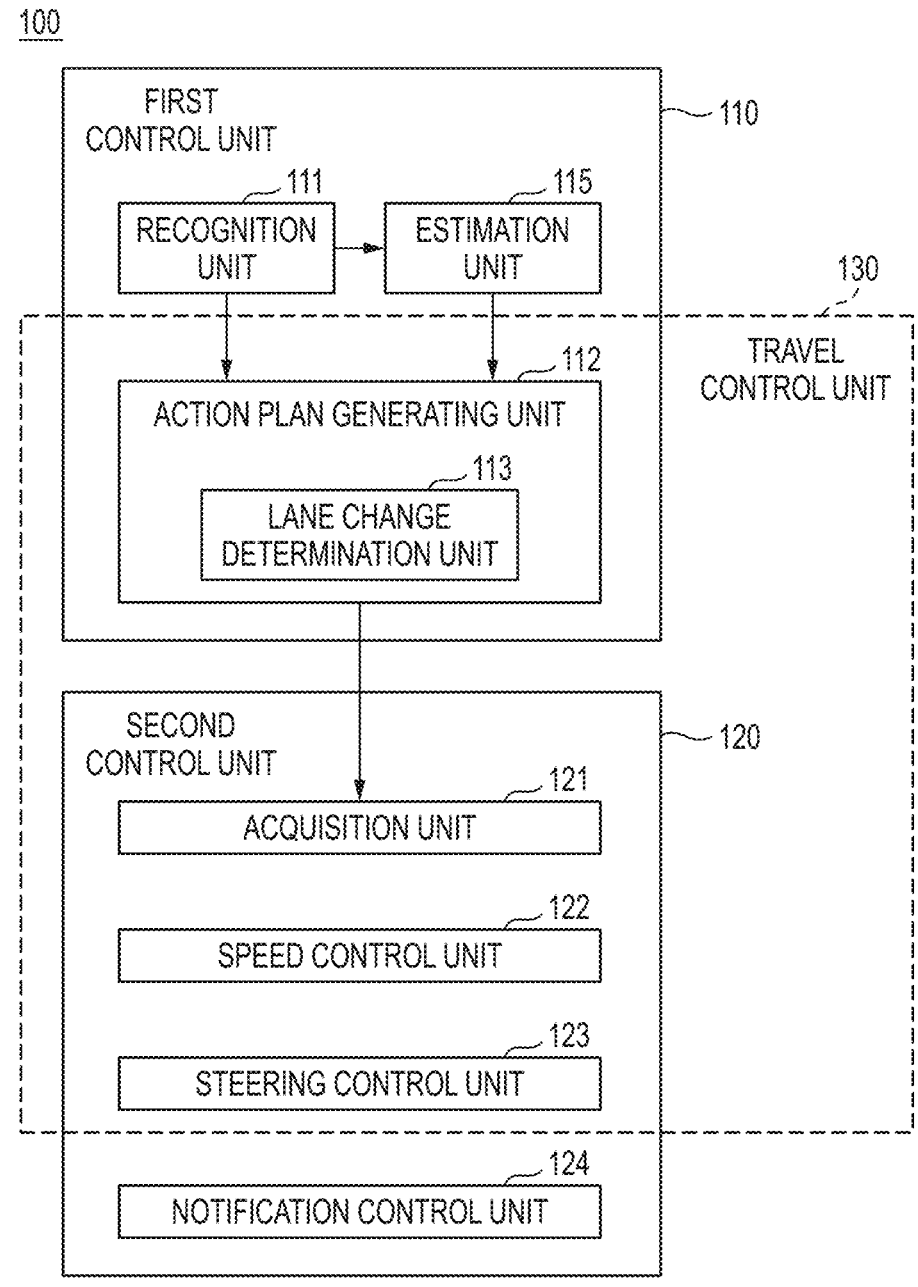
FIG. 2 is a diagram showing an example of a configuration of a control device 100.

FIG. 2 is a diagram showing an example of a configuration of the control device 100. The control device 100 includes, for example, a first control unit 110 and a second control unit 120.

The first control unit 110 includes, for example, a recognition unit 111, an action plan generating unit 112, and an estimation unit 115. The first control unit 110 implements, for example, a function based on artificial intelligence (AI) and a function based on a model given in advance, in parallel.

The recognition unit 111 recognizes a surrounding situation of the vehicle 1 based on information received from the camera 12, the radar device 13, and the LIDAR 14 via the object recognition device 16. Specifically, the recognition unit 111 recognizes position information of an object (including another vehicle to be described later) around the vehicle 1; a traveling state including a speed, an acceleration, and the like of the object; and identification information of the object.

For example, the position of the object is recognized as a position on absolute coordinates with a representative point (a center of gravity, a drive shaft center, or the like) of the vehicle 1 as an origin, and is used for control. The position of the object may be represented by a representative point such as a center of gravity or a corner of the object, or may be represented by a region.

A "state" of the object may include an acceleration or jerk of the object, or an "action state" (for example, whether the object is changing a lane, or whether the object is about to change the lane).

For example, the recognition unit 111 recognizes a travel environment in which the vehicle 1 is traveling. For example, the recognition unit 111 recognizes a travel lane of the vehicle 1 by comparing a pattern of road division lines (for example, an array of solid lines and broken lines) obtained from the second map information 72 with a pattern of road division lines around the vehicle 1 recognized from an image captured by the camera 12. The recognition unit 111 may recognize the travel lane by recognizing not only the road division lines but also a course boundary (road boundary) including a road division line, a road shoulder, a curbstone, a median strip, a guard rail, and the like. In the recognition, the position of the vehicle 1 acquired from the navigation device 60 or a processing result of the INS may be added. Further, the recognition unit 111 may recognize a temporary stop line, an obstacle, a red signal, a tollgate, and other road events.

When recognizing the travel lane, the recognition unit 111 recognizes a position and a posture of the vehicle 1 with respect to the travel lane. For example, the recognition unit 111 may recognize a deviation of a reference point of the vehicle 1 from a lane center and an angle of a traveling direction of the vehicle 1 with respect to a line connecting lane centers, as a relative position and a posture of the vehicle 1 with respect to the travel lane. Alternatively, the recognition unit 111 may recognize a position of the reference point of the vehicle 1 with respect to any side end portion (road division line or road boundary) of the travel lane as the relative position of the vehicle 1 with respect to the travel lane.

The recognition unit 111 recognizes the identification information of the object. Here, the identification information of the object is information for identifying each object recognized by the recognition unit 111, and includes, for example, information indicating an external feature such as an outer shape or a color of each object. When the object recognized by the recognition unit 111 is a vehicle including a so-called license plate, the identification information of the object may include information indicating a license described on the license plate. For example, when the identification information of the previously recognized object matches the identification information of the currently recognized object, the recognition unit 111 determines that the currently recognized object is the same as the previously recognized object.

The action plan generating unit 112 generates a target trajectory for the vehicle 1 to automatically (that is, not based on an operation of the driver) travel in the future such that the vehicle 1 travels in principle in the recommended lane determined by the recommended lane determination unit 71, and responds to the surrounding situation of the vehicle 1.

The target trajectory includes, for example, a speed element. For example, the target trajectory is represented by arranging points (trajectory points) to be reached by the vehicle 1 in order. The trajectory point is a point to be reached by the vehicle 1 for each predetermined travel distance (for example, about several meters) along a road, and separately, a target speed and a target acceleration for each predetermined sampling time (for example, about a few fractions of a second) are generated as a part of the target trajectory. Further, the trajectory point may be a position to be reached by the vehicle 1 at a sampling time point within each predetermined sampling time. In this case, information on the target speed and the target acceleration is expressed by an interval of the trajectory points.

The action plan generating unit 112 may set an event of automatic-driving when generating the target trajectory. The event of the automatic-driving includes a constant speed traveling event, a low speed following traveling event, a lane change event, a branching event, a merging event, a take over event, and the like. The action plan generating unit 112 generates the target trajectory according to an activated event.

For example, the action plan generating unit 112 includes a lane change determination unit 113 as a function of setting a lane change event.

The lane change determination unit 113 determines, based on the travel environment of the vehicle 1 recognized by the recognition unit 111, whether control of changing a lane in which the vehicle 1 travels (hereinafter also referred to as lane change control) is executable. The lane change determination unit 113 determines whether the lane change control is executable based on the travel environment of the vehicle 1, for example, regardless of an operation (for example, an operation on the blinker lever 81) of the driver.

For example, when an inter-vehicle distance between the vehicle 1 and another vehicle (also referred to as a preceding vehicle) traveling in front of the vehicle 1 in the travel lane is equal to or less than a predetermined threshold value, the lane change determination unit 113 determines to perform the lane change control. Further, when another vehicle traveling in an adjacent lane adjacent to the travel lane of the vehicle 1 is detected, the lane change determination unit 113 determines whether the lane change control is executable based on, for example, a relative speed and the inter-vehicle distance between the vehicle 1 and the other vehicle that is detected.

When the lane change determination unit 113 determines that the lane change control is executable, the action plan generating unit 112 sets a lane change event and generates a target trajectory corresponding to the lane change event.

The estimation unit 115 estimates whether an object is present in a difficult-to-detect region to be described later based on the surrounding situation recognized by the recognition unit 111. The estimation unit 115 will be described later.

The second control unit 120 controls the vehicle 1 to pass through, at a scheduled time, the target trajectory generated by the action plan generating unit 112. The second control unit 120 includes, for example, an acquisition unit 121, a speed control unit 122, a steering control unit 123, and a notification control unit 124.

The acquisition unit 121 acquires information on the target trajectory (trajectory points) generated by the action plan generating unit 112 and stores the information in a memory (not shown).

The speed control unit 122 controls the travel driving force output device 200 or the brake device 210 based on the speed element accompanying the target trajectory stored in the memory.

The steering control unit 123 controls the steering device 220 according to a degree of curvature of the target trajectory stored in the memory.

The processing of the speed control unit 122 and the steering control unit 123 is implemented by, for example, a combination of feedforward control and feedback control.

The notification control unit 124 controls the HMI 30, the navigation HMI 62, and the like to issue various notifications (presentation of various information) to an occupant (for example, a driver) of the vehicle 1. For example, the notification control unit 124 notifies the occupant of a start of the lane change control, or, when the lane change control is cancelled midway, notifies the occupant of the cancelling. The start notification of the lane change control or the notification of cancelling the lane change control is issued, for example, by displaying on a display device such as the HMI 30 or the navigation HMI 62 or by outputting a sound from a speaker.

In the control device 100, for example, a combination of the action plan generating unit 112 of the first control unit 110 and the acquisition unit 121, the speed control unit 122, and the steering control unit 123 of the second control unit 120 constitutes a travel control unit 130. For example, when the lane change determination unit 113 determines that the lane change control is executable, the travel control unit 130 executes the lane change control.

(Lane Change Control)

The lane change control of the control device 100 will be described in detail.

The vehicle 1 is configured to travel in a plurality of driving modes. The plurality of driving modes include, for example, a self-driving mode in which the vehicle 1 autonomously travels regardless of an operation of the driver on the driving operator 80, a driving assistance mode in which some driving operations are performed by the driver, and the like, and the control device 100 executes driving control corresponding to each mode. A lane change function capable of executing the lane change control described above is one of various functions included in the self-driving mode and the driving assistance mode.

The lane change function is switched on/off, that is, enabled/disabled, for example, according to an instruction (for example, press-down of a switch of the HMI 30) from the driver. When the lane change function is enabled, the lane change control becomes available to be executed. Specifically, in a case where the lane change function is enabled, the lane change determination unit 113 determines whether the lane change control is executable while the vehicle 1 is travelling, and when it is determined that the lane change control is executable, the travel control unit 130 executes the lane change control. On the other hand, when the lane change function is disabled, the lane change control cannot be executed. Specifically, in a case where the lane change function is disabled, the lane change determination unit 113 does not determine whether the lane change control is executable while the vehicle 1 is traveling, and the travel control unit 130 does not execute the lane change control.

FIG. 3 shows an example of a lane change operation of the vehicle 1 under the lane change control. Here, a case will be described as an example in which the lane change function is enabled and the vehicle 1 autonomously travels under the control of the control device 100 regardless of an operation of the driver. At this time, according to the surrounding situation of the vehicle 1 or the like recognized by the recognition unit 111, the control device 100 may appropriately execute the lane change control of changing the lane in which the vehicle 1 travels.

A road 300 includes a left lane 310, a right lane 320, and a division line 330 provided at a boundary between the left lane 310 and the right lane 320 and serving as a road division line. Traveling directions of the left lane 310 and the right lane 320 are directions from up to down in FIG. 3. Hereinafter, the travel lane of the vehicle 1 is also referred to as an "own lane L1". Hereinafter, a lane adjacent to the own lane L1 is also referred to as an "adjacent lane L2".

While the vehicle 1 is traveling in the left lane 310 of the road 300, the control device 100 executes lane change control in order to overtake a preceding vehicle M1 traveling in the own lane L1 at a slower speed than the vehicle 1.

Specifically, the control device 100 determines whether the lane change control is executable based on the surrounding situation recognized by the recognition unit 111.

When it is determined that the lane change control is executable, the control device 100 notifies, via the HMI 30, the driver of the vehicle 1 that the lane change control is to be started. The notification that the lane change control is to be started (hereinafter, also referred to as a start notification of the lane change control) is, for example, display using a display device attached to the vehicle 1 or a notification issued by sound from a speaker.

In addition to the start notification of the lane change control, the control device 100 issues a notification for promoting the driver to confirm the surroundings of the vehicle 1. Accordingly, the driver checks the surroundings of the vehicle 1 in the lane change direction (right direction). Specifically, the driver checks the right side mirror or directly checks a lateral side (right side) of the vehicle 1.

After a predetermined time has elapsed from when the start notification of the lane change control is started, the control device 100 starts to turn on the blinker 5 on the right side. Accordingly, the lane change of the vehicle 1 is notified to the outside of the vehicle 1.

After a predetermined time has elapsed from the start of turning on the blinker 5, the control device 100 starts the lane change control to the right side. Accordingly, the control device 100 starts steering the vehicle 1, and the vehicle 1 starts lateral movement. When the vehicle 1 moves laterally to the adjacent lane L2, the lane change control is completed.

(Detection Region and Difficult-To-Detect Region)

In order to perform an appropriate lane change that ensures the safety of the vehicle 1, it is necessary to perform the lane change in a situation in which an object (for example, another moving object) that may collide with the vehicle 1 is not present around the vehicle 1. Meanwhile, due to the number, an arrangement, a performance, and the like of the external sensors 11 mounted on the vehicle 1, a region (hereinafter, also referred to as a difficult-to-detect region) in which accuracy of detecting the object by the external sensor 11 is relatively lower than that in other regions may exist around the vehicle 1, and accordingly, it may be difficult for the control device 100 to accurately recognize all the surrounding situations of the vehicle 1.

In a case where the lane change function is enabled in the vehicle 1 around which the difficult-to-detect region may exist, for example, when it is estimated that an object enters the difficult-to-detect region based on information obtained in advance by the external sensor 11, it is conceivable to restrict execution of the lane change control. Specifically, it is conceivable that the control device 100 restricts the execution of the lane change control in a state in which the lane change function is enabled. In this way, the execution of the lane change control may be prevented in a situation in which an object that may collide with the vehicle 1 is present in the difficult-to-detect region, and the lane change control is executable again by releasing the restriction on the lane change control when the object is no longer present in the difficult-to-detect region.

However, if a state in which it is estimated that the object enters the difficult-to-detect region continues, it may be difficult for the control device 100 to determine whether the lane change control is executable. Specifically, when the external sensor 11 cannot detect that the object has left the difficult-to-detect region, the state in which it is estimated that the object enters the difficult-to-detect region continues although the object has actually left the difficult-to-detect region. At this time, the control device 100 continues to restrict the lane change control although the lane change control is executable, that is, it is difficult to correctly determine whether the lane change control is executable.

Therefore, in the present embodiment, the control device 100 performs processing to be described below to prevent the state in which it is difficult to determine whether the lane change control is executable from continuing for a long time.

Figure 4:
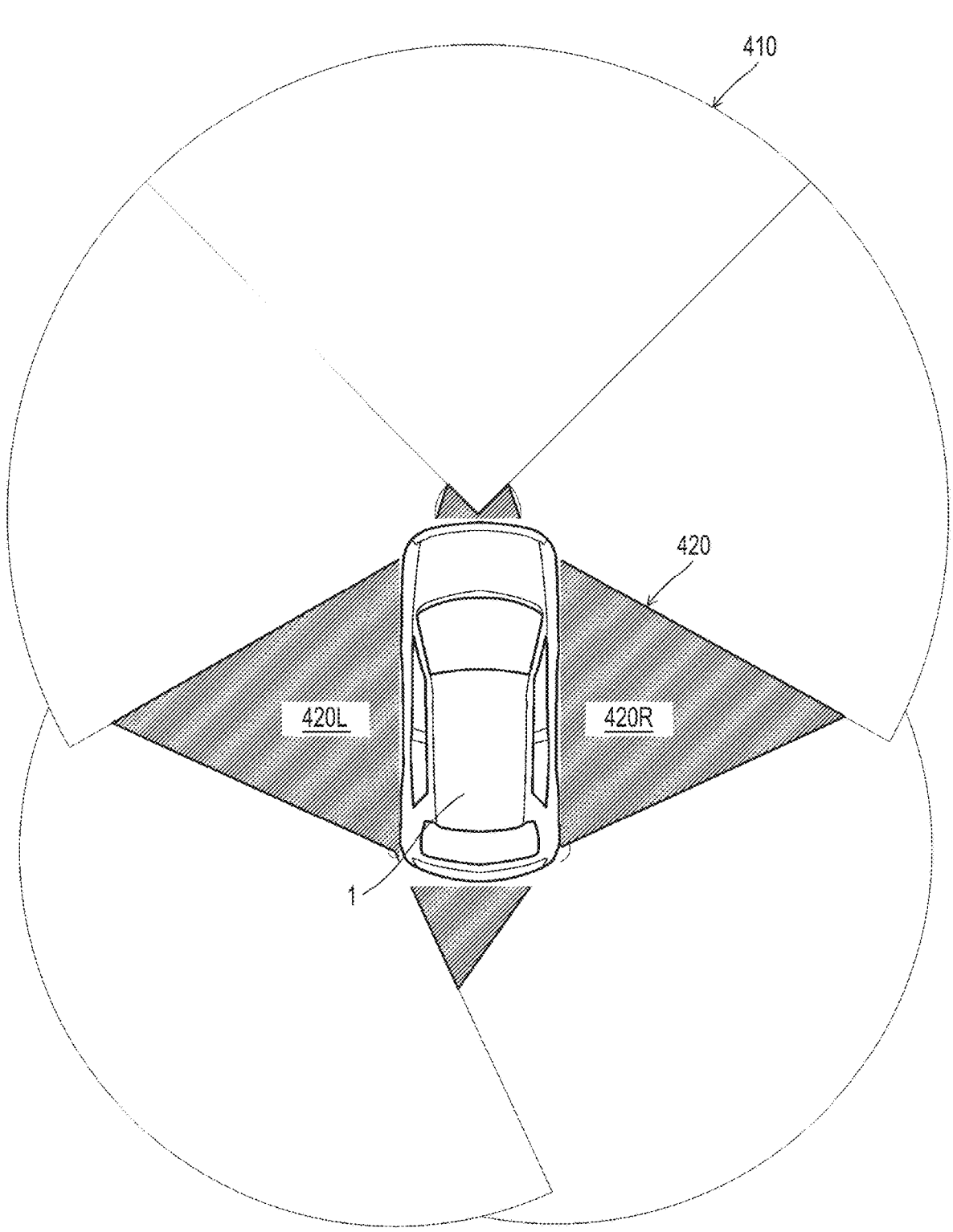
FIG. 4 is a diagram schematically showing a detection region 410 and a difficult-to-detect region 420 around the vehicle 1.

First, examples of the difficult-to-detect region and a detection region in which the accuracy of detecting an object by the external sensor 11 is higher than that in the difficult-to-detect region will be described. FIG. 4 is a diagram showing a detection region 410 and a difficult-to-detect region 420 (shaded region) around the vehicle 1. The detection region 410 and the difficult-to-detect region 420 shown in FIG. 4 are merely schematically shown, and positions and sizes of these regions do not necessarily match those of actual regions.

The detection region 410 is a region in which the accuracy of detecting an object (for example, another vehicle) by the external sensor 11 is high, and exists in a wide region around the vehicle 1.

The control device 100 recognizes, as the surrounding situation, position information, a traveling state, and identification information of an object in the detection region 410 detected by the external sensor 11.

The difficult-to-detect region 420 is a region in which the detection accuracy of the external sensor 11 is relatively lower as compared with that in the detection region 410. The difficult-to-detect region 420 exists due to, for example, the number, an arrangement, and a performance of the external sensors 11 mounted on the vehicle 1. In addition, the difficult-to-detect region 420 also includes a region in which the detection accuracy of the external sensor 11 is decreased due to the presence of a shielding object such as a signboard or a guard rail although the difficult-to-detect region 420 is originally the detection region 410.

In the present embodiment, a case where the difficult-to-detect region 420 is mainly present on left and right sides of the vehicle 1 in the vicinity of the vehicle 1 will be described as an example. A right region in the difficult-to-detect region 420 is defined as a right difficult-to-detect region 420R, and a left region is defined as a left difficult-to-detect region 420L.

Figure 5:
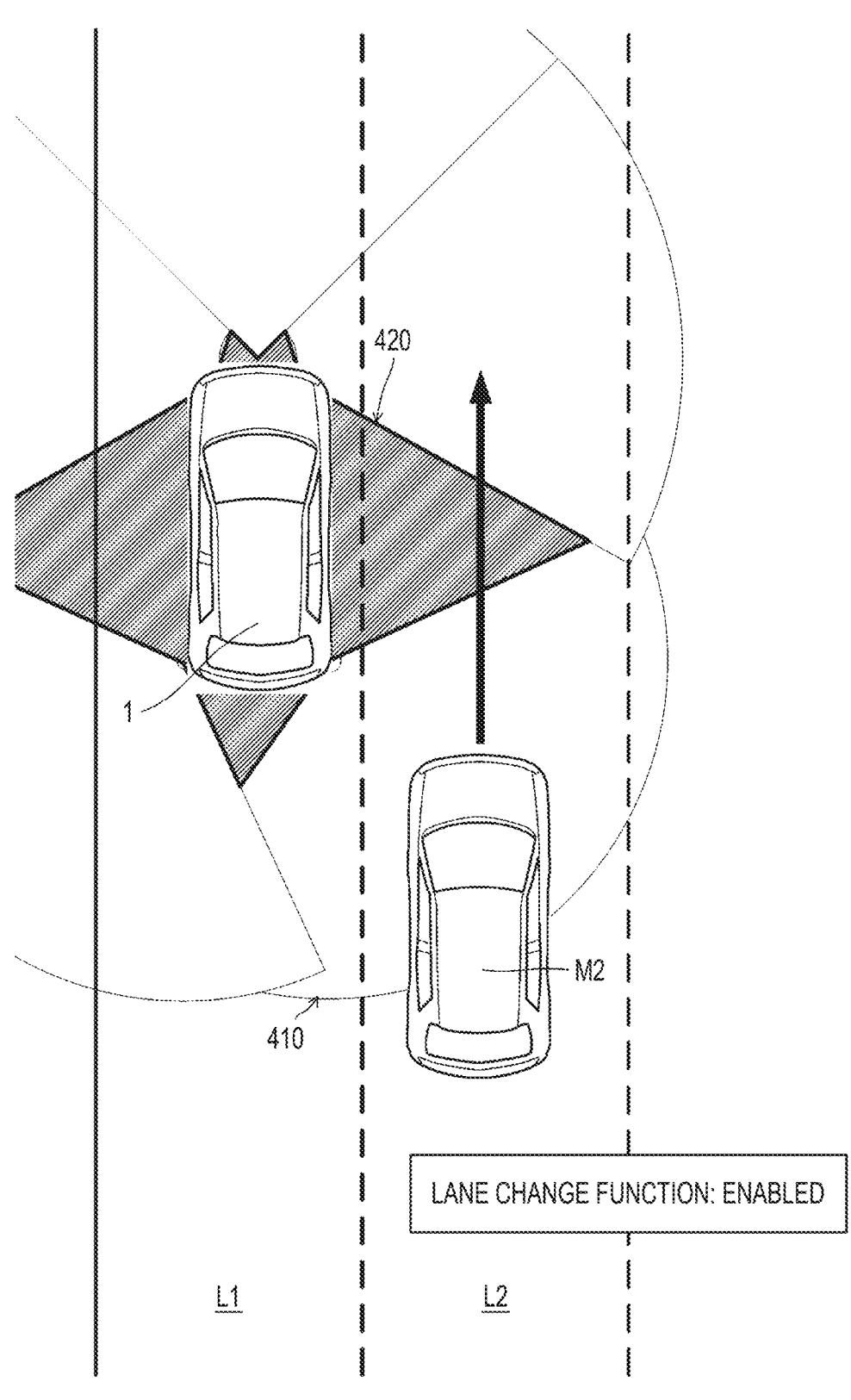
FIG. 5 is a diagram showing a state in which another vehicle M2 is present in the detection region 410 of the vehicle 1.

As shown in FIG. 5, when another vehicle M2 traveling in the adjacent lane L2 enters the detection region 410 of the vehicle 1 while the vehicle 1 is traveling in the own lane L1, the external sensor 11 of the vehicle 1 detects the other vehicle M2. At this time, the control device 100 recognizes position information, traveling state information, and identification information of the other vehicle M2 in the detection region 410 at predetermined time intervals, and stores these information into a storage device of the control device 100 in association with one another.

Figure 6:
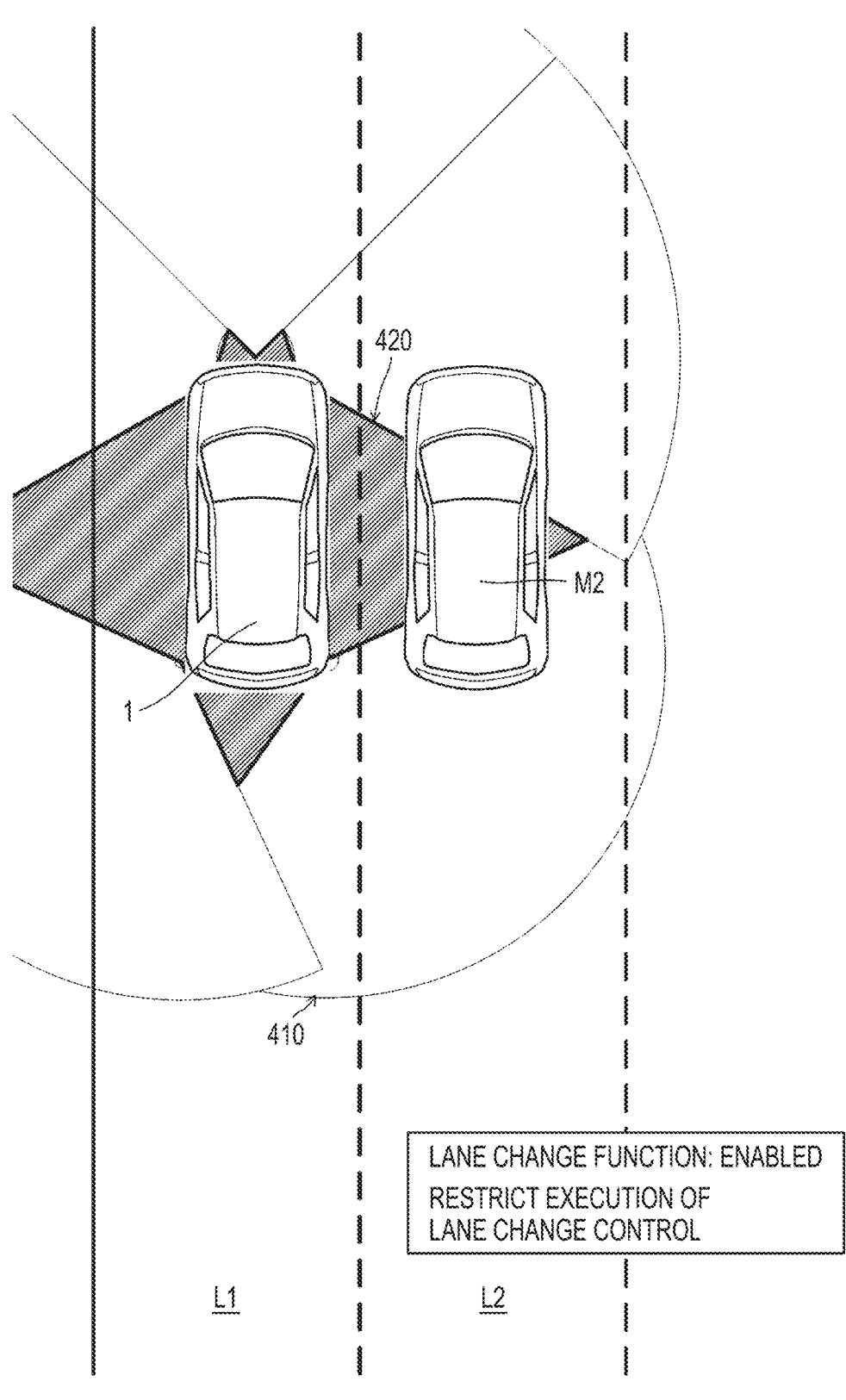
FIG. 6 is a diagram showing a state in which the other vehicle M2 enters the difficult-to-detect region 420 of the vehicle 1.

As shown in FIG. 6, when the other vehicle M2 relatively approaches the vicinity of the vehicle 1 due to acceleration and deceleration of the vehicle 1 and/or the other vehicle M2, the other vehicle M2 enters the difficult-to-detect region 420 (here, the right difficult-to-detect region 420R). At this time, the accuracy of detecting the other vehicle M2 by the external sensor 11 is decreased or the other vehicle M2 is no longer detected. That is, it is difficult to detect the other vehicle M2.

The estimation unit 115 of the control device 100 estimates that the other vehicle M2 is present in the difficult-to-detect region 420 based on the surrounding situation of the other vehicle M2 stored in advance. Specifically, when the accuracy of detecting the other vehicle M2 by the external sensor 11 is decreased or when the other vehicle M2 is no longer detected, the estimation unit 115 estimates that the other vehicle M2 is present in the difficult-to-detect region 420. Accordingly, even when the other vehicle M2 enters the difficult-to-detect region 420 and is no longer detected by the external sensor 11, the control device 100 may recognize the surrounding situation of the vehicle 1 including the difficult-to-detect region 420 by estimation.

In a case where the vehicle 1 is traveling in a state in which the lane change function is enabled, when it is estimated that the other vehicle M2 is present in the difficult-to-detect region 420, the control device 100 restricts the execution of the lane change control while maintaining the lane change function enabled. Accordingly, the execution of the lane change control may be prevented in a situation in which the vehicle 1 and the other vehicle M2 may collide with each other.

Figure 7:
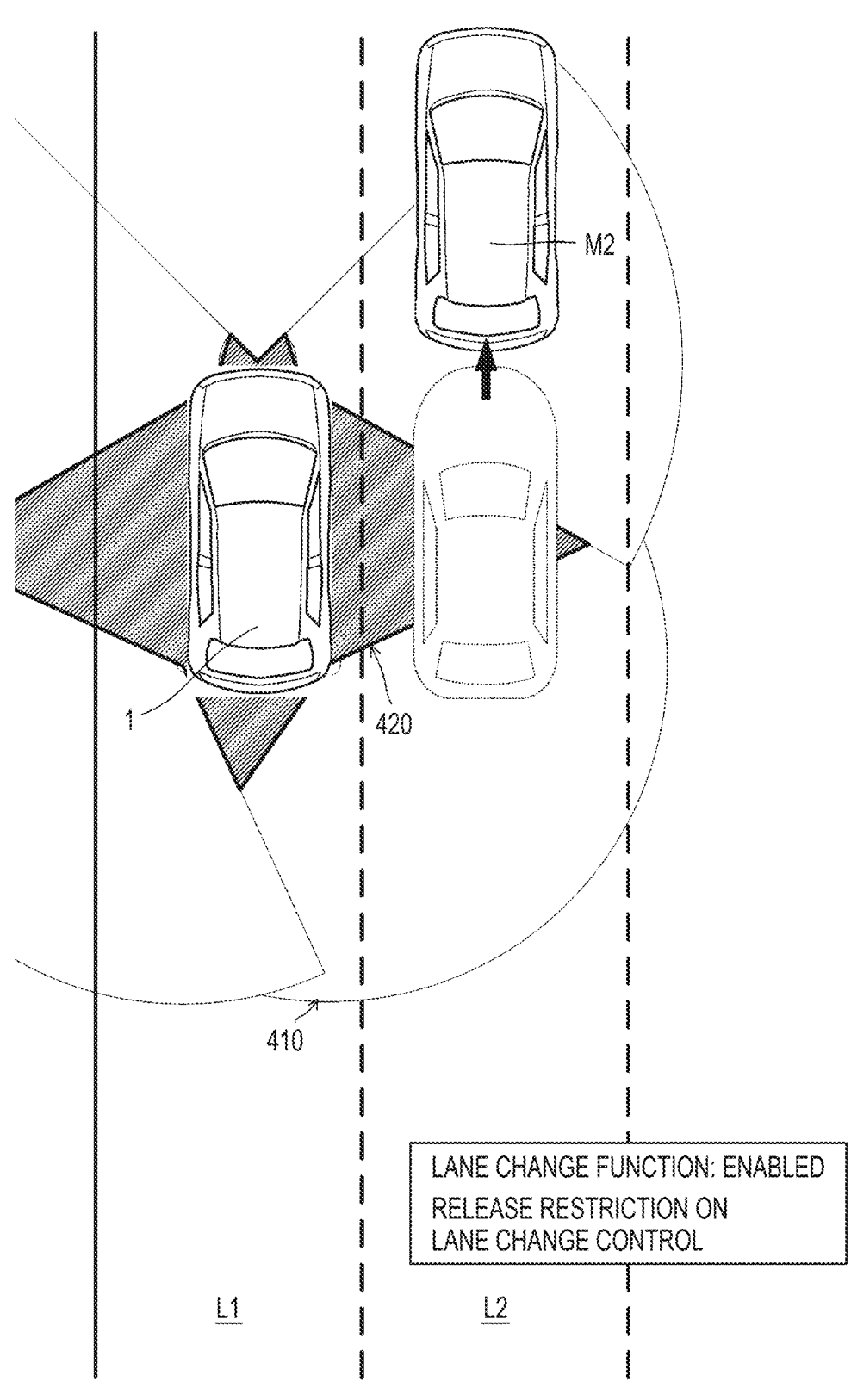
FIG. 7 is a diagram showing a state in which the other vehicle M2 present in the difficult-to-detect region 420 moves to the detection region 410.

As shown in FIG. 7, when the other vehicle M2 estimated to be present in the difficult-to-detect region 420 is detected again in the detection region 410, the control device 100 determines that the other vehicle M2 has left the difficult-to-detect region 420 and is not present in the difficult-to-detect region 420, and releases the restriction on the lane change control.

Specifically, when the identification information of the other vehicle M2 estimated to be present in the difficult-to-detect region 420 matches identification information of an object detected in the detection region 410 after the other vehicle M2 is estimated to be present in the difficult-to-detect region 420, the control device 100 recognizes that the object detected in the detection region 410 is the other vehicle M2. In other words, the control device 100 determines that the other vehicle M2 has left the difficult-to-detect region 420, that is, the other vehicle M2 is not present in the difficult-to-detect region 420. Then, the control device 100 releases the restriction on the lane change control. At this time, since the lane change function remains enabled, the control device 100 may execute the lane change control based on the surrounding situation.

Figure 8:
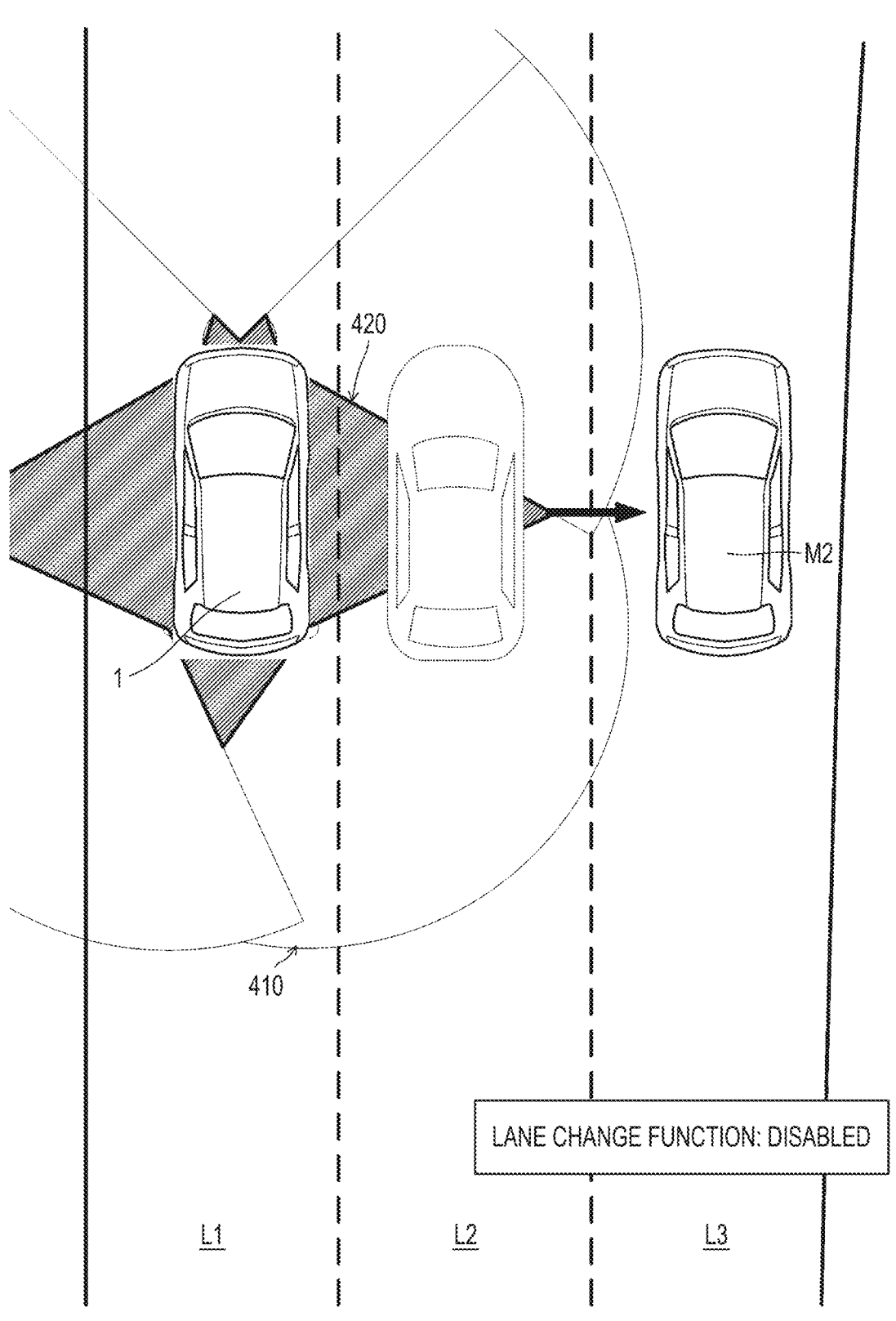
FIG. 8 is a diagram showing a state in which the other vehicle M2 present in the difficult-to-detect region 420 moves to the outside of the difficult-to-detect region 420 without being detected by an external sensor 11.

On the other hand, as shown in FIG. 8, the other vehicle M2 present in the difficult-to-detect region 420 may move from the difficult-to-detect region 420 to another difficult-to-detect region as a result of a lane change, for example, without being detected by the external sensor 11. The other difficult-to-detect region here is a region which is not detected by the external sensor 11 and which is outside the detection region 410 and outside the difficult-to-detect region 420, and is a region which does not hinder the lane change of the vehicle 1. In this case, the estimation unit 115 of the control device 100 continuously estimates that the other vehicle M2 is present in the difficult-to-detect region 420 although the other vehicle M2 is no more present in the difficult-to-detect region 420.

In such a state, although the lane change should be executable by the control device 100, the restriction on the lane change control is continued. That is, as described above, it is difficult for the control device 100 to correctly determine whether the lane change control is executable. In addition, this state is a state in which the lane change control is not executed although the lane change function is enabled, which may give a sense of discomfort to the driver.

Therefore, when a state in which it is estimated that the other vehicle M2 is present in the difficult-to-detect region 420 continues for a predetermined time, the control device 100 disables the lane change function. Accordingly, the state in which it is difficult for the control device 100 to determine whether the lane change control is executable may be prevented from continuing for a long time. Further, since the control device 100 disables the lane change function, it is possible to avoid executing the lane change control when the other vehicle M2 is actually present in the difficult-to-detect region 420 for a predetermined time.

After disabling the lane change function, when the HMI 30 or the like receives an instruction to enable the lane change function from the driver, the control device 100 enables the lane change function and enables execution of the lane change control. As described above, the state in which the lane change control is not executed although the lane change function is enabled is quickly eliminated, and the lane change function is enabled in response to an instruction from the driver, and thus a decrease in an execution opportunity of the lane change control may be prevented.

(Control Flow of Estimation Processing)

Next, an example of processing of the control device 100 estimating whether another vehicle is present in the difficult-to-detect region 420 will be described with reference to a flowchart shown in FIG. 9. In a state in which the vehicle 1 autonomously travels under the control of the control device 100, the control device 100 repeatedly executes, for example, the flowchart of FIG. 9 at a predetermined interval.

The control device 100 first recognizes the surrounding situation including the position information, the traveling state, and the identification information of another vehicle detected in the detection region 410, and stores the surrounding situation into the storage device (step S100).

The control device 100 estimates whether another vehicle is present in the difficult-to-detect region 420 based on the surrounding situation recognized by the recognition unit 111 (step S102).

When it is estimated that another vehicle is present in the difficult-to-detect region 420 (step S104: YES), the control device 100 sets the presence flag indicating whether another vehicle is present in the difficult-to-detect region 420 to be ON (step S106), and ends the flowchart. When the presence flag is ON, execution of the lane change control is restricted even when the lane change function is enabled since it is estimated that another vehicle is present in the difficult-to-detect region 420.

More specifically, when it is estimated that another vehicle is present in the right difficult-to-detect region 420R, the control device 100 sets the presence flag of another vehicle in the right difficult-to-detect region 420R to be ON. Accordingly, execution of the lane change control to the right adjacent lane is restricted. When it is estimated that another vehicle is present in the left difficult-to-detect region 420L, the control device 100 sets the presence flag of another vehicle in the left difficult-to-detect region 420L to be ON. Accordingly, execution of the lane change control to the left adjacent lane is restricted.

On the other hand, when it is determined that no vehicle is present in the difficult-to-detect region 420 (step S104: NO), the control device 100 sets the presence flag to be OFF (step S108) and ends the flowchart. When the presence flag is OFF, the lane change control is executable. In a case where the presence flag is switched from ON to OFF, the control device 100 releases the restriction on the lane change control and enables the execution of the lane change control.

Control Flow of Switching Lane Change Function

Figure 10:
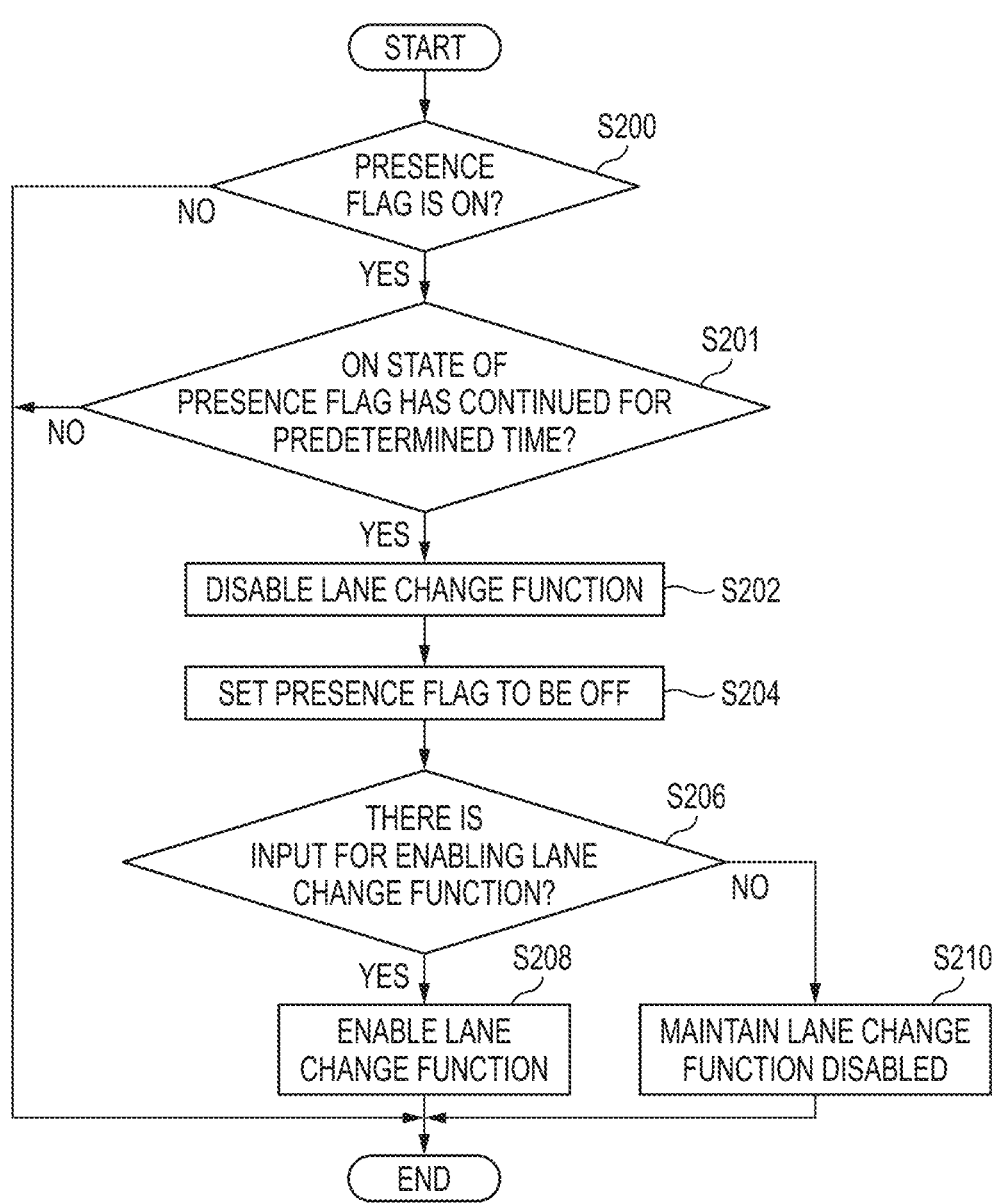

Next, an example of processing executed by the control device 100 when the presence flag of another vehicle in at least one of the right difficult-to-detect region 420R and the left difficult-to-detect region 420L is set to be ON in step S106 will be described with reference to a flowchart shown in FIG. 10. The control device 100 repeatedly executes, for example, the flowchart of FIG. 10 at predetermined intervals.

The control device 100 first determines whether the presence flag is ON (step S200). Specifically, when the presence flag is set to be ON in step S106, the control device 100 determines that the presence flag is ON in step S200. On the other hand, when it is determined that the presence flag is OFF (step S200: NO), the control device 100 ends the flowchart as it is.

When it is determined that the presence flag is ON (step S200: YES), the control device 100 determines whether a state in which the presence flag is ON has continued for a predetermined time (step S201).

When it is determined that the state in which the presence flag is ON has continued for the predetermined time (step S201: NO), the control device 100 ends the current control flow as it is.

Figure 9:
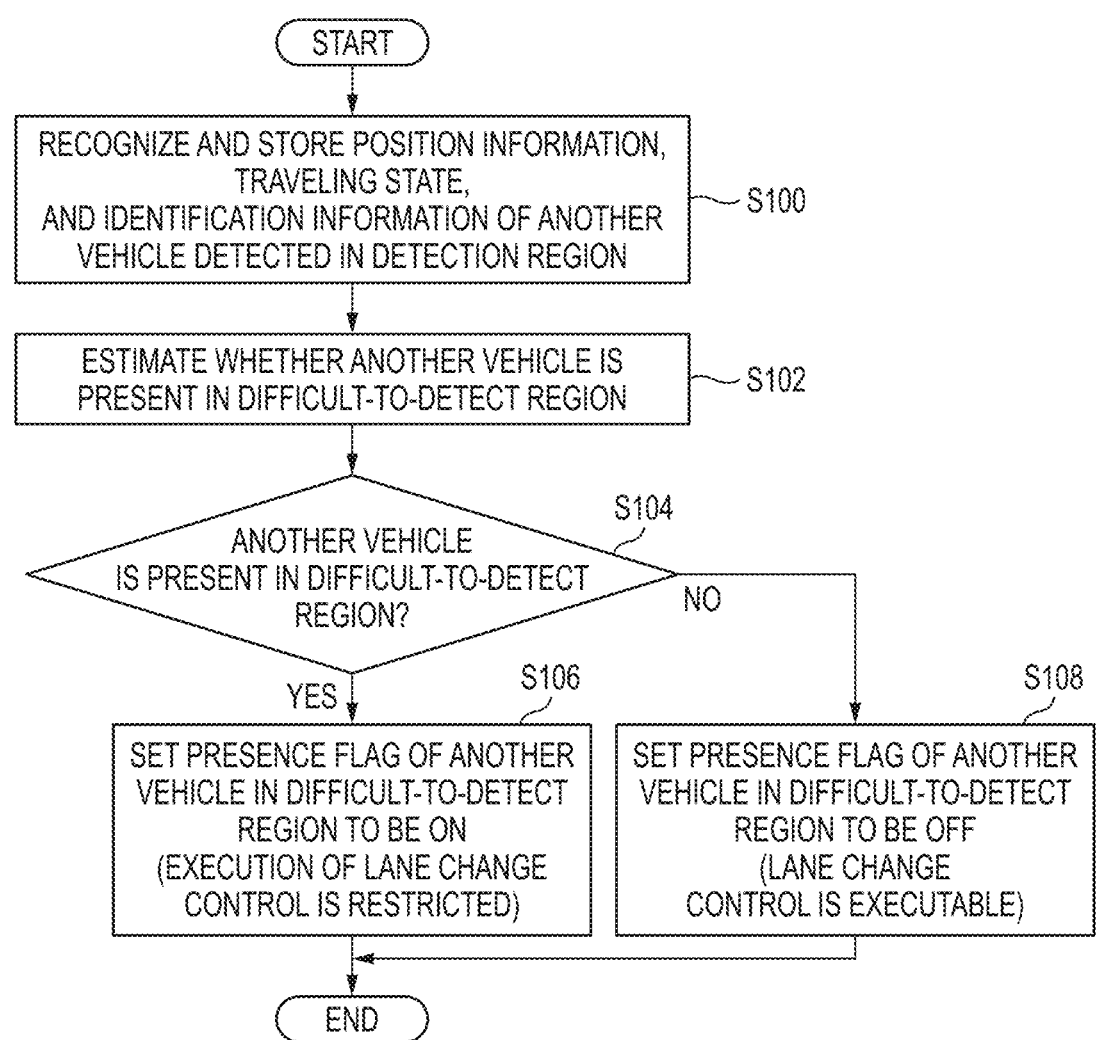
FIG. 9 is a flowchart showing an example of processing of the control device 100 estimating whether another vehicle is present in the difficult-to-detect region 420.

Here, before the state in which the presence flag is ON continues for the predetermined time, the control device 100 repeatedly executes the processing in FIG. 9, and in a case where the other vehicle M2 estimated to be present in the right difficult-to-detect region 420R as in FIG. 7 is detected again in the detection region 410, for example, it is determined in step S104 that the other vehicle M2 is not present in the right difficult-to-detect region 420R (step S104: NO). At this time, the presence flag of another vehicle in the right difficult-to-detect region 420R is set to OFF (step S108), and the control device 100 determines that the presence flag is OFF in step S200 of FIG. 10 and ends the flowchart.

Returning to FIG. 10, when it is determined that the state in which the presence flag is ON has continued for the predetermined time (step S201: YES), the control device 100 disables the lane change function (step S202). Disabling the lane change function eliminates a state in which the execution of the lane change control is restricted even while the lane change function is enabled. That is, the state in which it is difficult for the control device 100 to determine whether the lane change control is executable is eliminated.

Further, the control device 100 switches the presence flag to OFF in response to the lane change function being disabled (step S204).

More specifically, when it is estimated that another vehicle is present in the right difficult-to-detect region 420R, the control device 100 switches the presence flag of another vehicle in the right difficult-to-detect region 420R from ON to OFF in response to the lane change function being disabled. When it is estimated that another vehicle is present in the left difficult-to-detect region 420L, the control device 100 switches the presence flag of another vehicle in the left difficult-to-detect region 420L from ON to OFF in response to the lane change function being disabled.

Next, the control device 100 determines whether there is an input for enabling the lane change function from the driver (step S206). For example, when the driver inputs, via the HMI 30 or the like, an instruction for enabling the lane change function, the control device 100 determines that there is an input for enabling the lane change function from the driver.

For example, after step S202 and step S204, the control device 100 may display that the lane change function is disabled on a display device such as the HMI 30, or may notify the driver by a speaker. Accordingly, the driver may grasp that the lane change function is disabled by the notification, and may quickly input an instruction for enabling the lane change function via the HMI 30 or the like.

When it is determined that there is an input for enabling the lane change function (step S206: YES), the control device 100 enables the lane change function (step S208). The control device 100 may execute step S204 of switching the presence flag to OFF not before step S206 but after step S206, for example, simultaneously with step S208.

When it is determined that there is no input for enabling the lane change function (step S206: NO), the control device 100 maintains the lane change function disabled (step S210).

Control Flow of Lane Change Control

Figure 11:
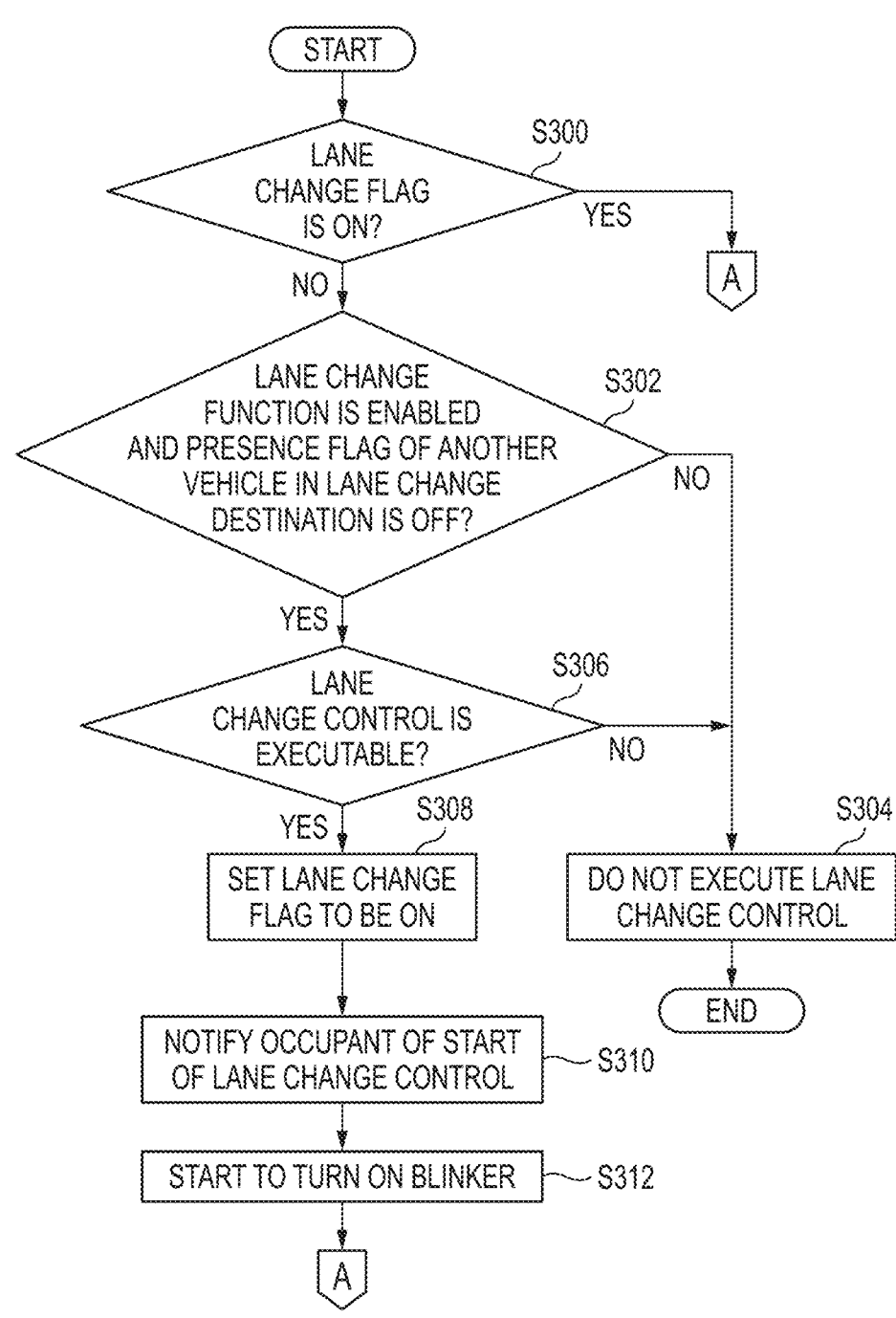
FIG. 11 is a flowchart showing an example of processing when the control device 100 executes the lane change control.
Figure 12:
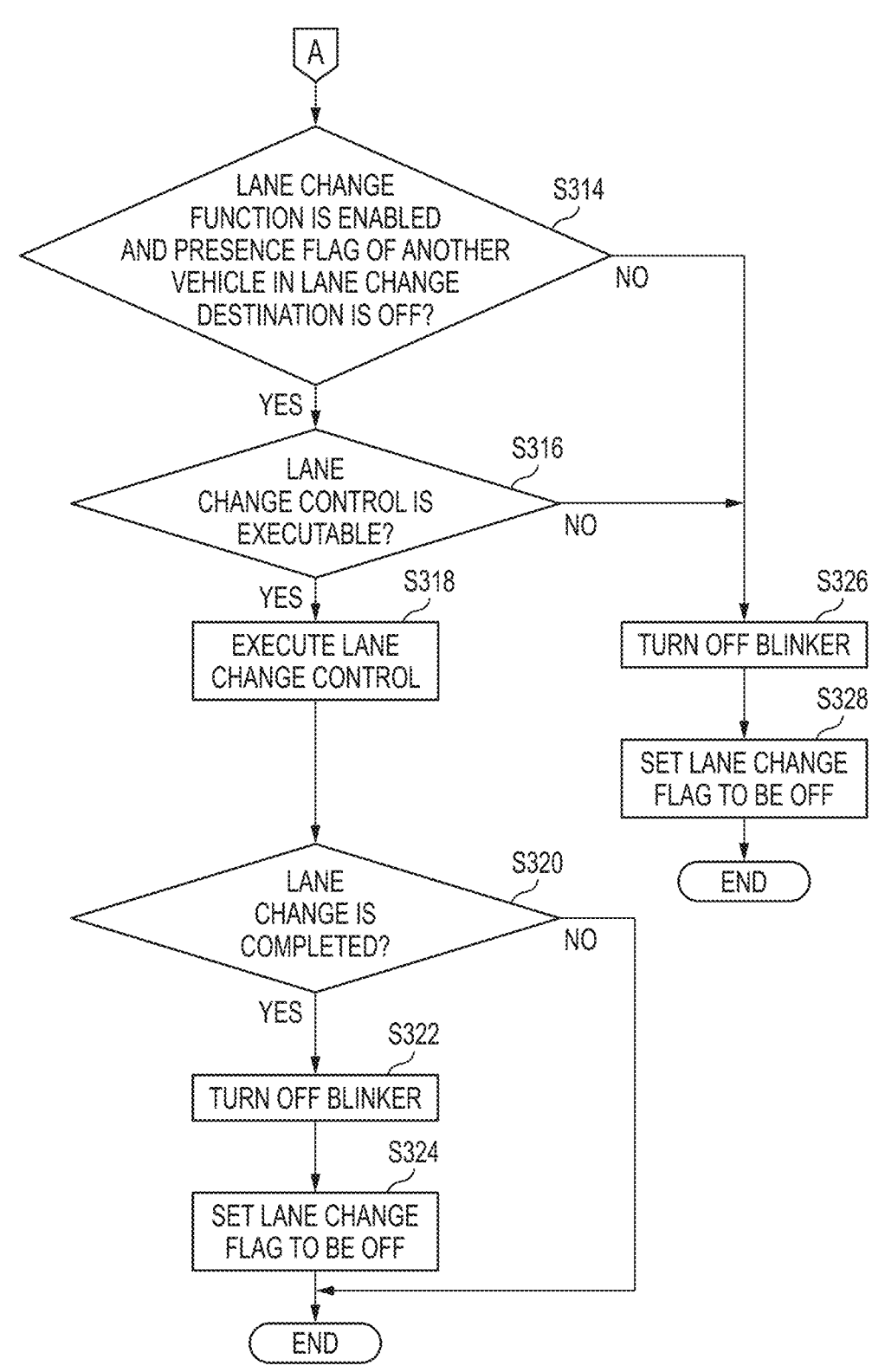
FIG. 12 is a continuation of the flowchart of FIG. 11.

Next, an example of processing when the control device 100 executes the lane change control will be described with reference to flowcharts shown in FIGS. 11 and 12. In the state in which the vehicle 1 autonomously travels under the control of the control device 100, the control device 100 repeatedly executes, for example, the flowcharts of FIGS. 11 and 12 at a predetermined interval.

The control device 100 first determines whether a lane change flag indicating that the lane change control is being executed is ON (step S300). When it is determined that the lane change flag is ON (step S300: YES), the control device 100 proceeds to processing of step S314 to be described later.

When it is determined that the lane change flag is OFF (step S300: NO), the control device 100 determines whether the lane change function is enabled and whether the presence flag of another vehicle in a lane change destination is OFF (step S302).

More specifically, when the lane change destination is a right direction, the control device 100 determines whether the lane change function is enabled and whether the presence flag in the right difficult-to-detect region 420R is OFF. When the lane change destination is a left direction, the control device 100 determines whether the lane change function is enabled and whether the presence flag in the left difficult-to-detect region 420L is OFF.

Here, when the lane change destination is the right direction, the presence flag of another vehicle in the left difficult-to-detect region 420L may be ON, and when the lane change destination is the left direction, the presence flag of another vehicle in the right difficult-to-detect region 420R may be ON. With such a configuration, even when it is estimated that another vehicle is present in the difficult-to-detect region 420 on one side in the left-right direction, an opportunity of performing the lane change on the other side may be ensured.

When it is determined that the lane change function is disabled or the presence flag of another vehicle in the lane change destination is ON (step S302: NO), the control device 100 determines not to execute the lane change control (step S304) and ends the current control flow as it is.

When it is determined that the lane change function is enabled and the presence flag of another vehicle in the lane change destination is OFF (step S302: YES), the control device 100 determines whether the lane change control is executable based on the surrounding situation recognized by the recognition unit 111 (step S306).

When it is determined that the lane change control is not executable (step S306: NO), the control device 100 determines not to execute the lane change control (step S304), and ends the current control flow as it is.

When it is determined that the lane change control is executable (step S306: YES), the control device 100 sets the lane change flag to be ON (step S308).

When the lane change flag is set to be ON, the control device 100 notifies the driver, via the HMI 30, that the lane change control is to be executed (step S310). The control device 100 also issues a notification for promoting the driver to confirm the surrounding situation.

After a predetermined time has elapsed from the start notification of the lane change control, the control device 100 turns on the blinker 5 (step S312).

Next, during a period from the start of turning on the blinker 5 to when the lane change control is started (that is, to when steering control is started), the control device 100 determines again whether the lane change function is enabled and whether the presence flag of another vehicle in the lane change destination is OFF (step S314).

When it is determined that the lane change function is disabled or the presence flag of another vehicle in the lane change destination is ON (step S314: NO), the control device 100 turns off the blinker 5 (step S326), sets the lane change flag to be OFF, and does not execute the lane change control (step S328). Then, the control device 100 ends the current control flow as it is. In this way, since the lane change control is not executed in a case where it is estimated that another vehicle enters the difficult-to-detect region 420 before the steering is started, safety of the lane change may be improved.

When it is determined that the lane change function is enabled and the presence flag of another vehicle in the lane change destination is OFF (step S314: YES), the control device 100 determines again whether the lane change control is executable based on the surrounding situation recognized by the recognition unit 111 (step S316).

When it is determined that the lane change control is not executable (step S316: NO), the control device 100 turns off the blinker 5 (step S326), sets the lane change flag to be OFF, and does not execute the lane change control (step S328). Then, the control device 100 ends the current control flow as it is. For example, the control device 100 determines that the lane change control is not executable in a case where a situation occurs the lane change control is not executable (for example, in a case where the preceding vehicle changes the lane to the adjacent lane after the blinker 5 is turned on) during a period from the determination that the lane change control is executable in step S306 to step S316.

When it is determined that the lane change control is executable (step S316: YES), the control device 100 executes the lane change control (step S318). Accordingly, the control device 100 starts the steering control, and the vehicle 1 starts to laterally move from the own lane L1 to the adjacent lane L2.

After the lane change control is started, the control device 100 determines whether the lane change is completed (step S320).

When it is determined that the lane change is not completed (step S320: NO), the control device 100 ends the current control flow as it is.

When the lane change control is completed (step S320: YES), the control device 100 turns off the blinker 5 (step S322), sets the lane change flag to be OFF (step S324), and ends the current control flow.

Modification

Figure 13:
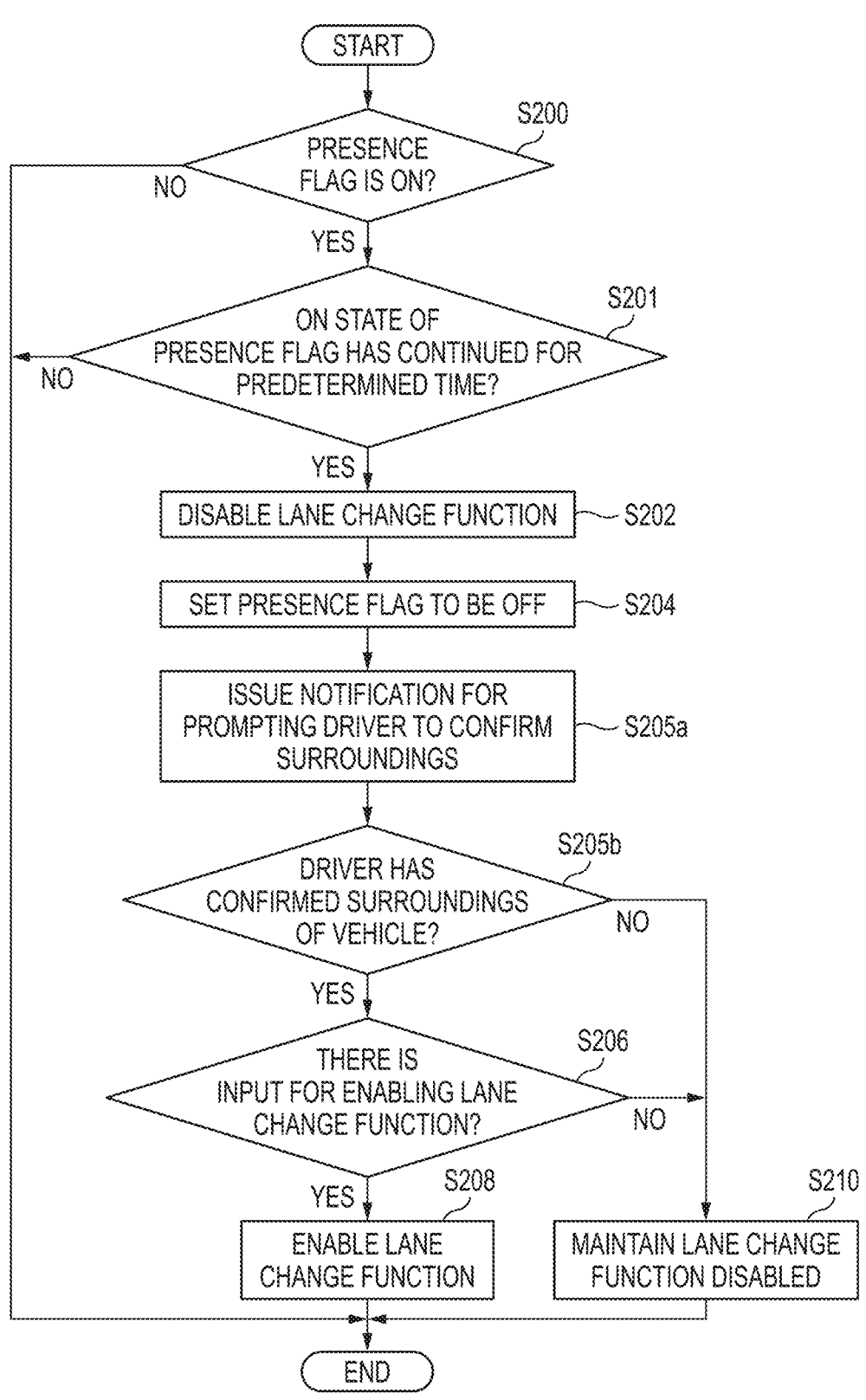
FIG. 13 is a flowchart showing a modification of processing executed by the control device 100 when the presence flag of another vehicle is ON in the difficult-to-detect region 420.

Next, a modification of the processing executed by the control device 100 when the presence flag of another vehicle is ON will be described with reference to FIG. 13. Steps similar to the steps shown in FIG. 10 are denoted by the same reference numerals, and description thereof is omitted.

In the modification, after the state in which the presence flag is ON has continued for a predetermined time in step S201, the control device 100 issues a notification for promoting the driver to confirm the surroundings of the vehicle 1 including the difficult-to-detect region 420 (step S205a). The notification for prompting the surrounding confirmation of the vehicle 1 is issued by, for example, displaying the notification on a display device such as the HMI 30 or the like or outputting a sound from a speaker.

After the notification for prompting the surrounding confirmation of the vehicle 1, the control device 100 may determine whether the driver has confirmed the surroundings of the vehicle 1 (step S205b). Specifically, whether the driver has confirmed the surroundings of the vehicle 1 may be determined based on a detection result of the driver monitor camera 50.

When it is determined that the driver has confirmed the surroundings of the vehicle 1 (step S205b: YES), the control device 100 proceeds to step S206 described above, and determines whether there is an input for enabling the lane change function from the driver. That is, in a case where the lane change function is disabled in step S202, in order to enable the lane change function again, a condition that the driver has confirmed the surroundings may be set. Thus, the lane change control may be more safely executed.

On the other hand, when it is not determined that the driver has confirmed the surroundings of the vehicle 1 (step S205b: NO), the processing proceeds to step S210 described above, and the control device 100 maintains the lane change function disabled.

For example, when the driver does not confirm the surroundings of the vehicle 1 in step S205b (step S205b: NO), there is a possibility that a physical trouble occurs in the driver (for example, condition deterioration or dozing off). Therefore, in a case where the driver does not confirm the surroundings of the vehicle 1 within a predetermined period, the control device 100 may execute travel control for stopping the vehicle 1 at a predetermined position while maintaining the lane change function disabled, or may issue a notification to a medical institution, a fire, a police, a family, or the like.

Although an embodiment and modifications of the present disclosure have been described above with reference to the accompanying drawings, it is needless to say that the present invention is not limited to the embodiment. It is apparent that those skilled in the art can conceive of various modifications and changes within the scope described in the claims, and it is understood that such modifications and changes naturally fall within the technical scope of the present invention. In addition, the components in the above embodiment may be freely combined without departing from the gist of the invention.

In this specification, at least the following matters are described. In parentheses, corresponding components and the like in the above embodiment are illustrated as an example, but the present invention is not limited thereto.

(1) A control device (control device 100) having a lane change function to execute lane change control of changing a lane in which a moving object (vehicle 1) travels, the moving object including an external sensor (external sensor 11) configured to detect an object around the moving object, the control device including:

a recognition unit (recognition unit 111) configured to recognize a surrounding situation of the moving object based on a detection result of the external sensor;

an estimation unit (estimation unit 115) configured to estimate, based on the surrounding situation recognized by the recognition unit, whether another moving object (another vehicle M2) is present in a specific region (difficult-to-detect region 420) in which accuracy of detecting the object by the external sensor is relatively lower as compared with that in other regions; and a travel control unit (travel control unit 130) configured to execute the lane change control based on the surrounding situation recognized by the recognition unit and an estimation result of the estimation unit, in which the lane change function is switchable to be enabled or disabled in response to an instruction from an occupant of the moving object, the lane change control is executable when the lane change function is enabled, and the lane change control is not executable when the lane change function is disabled, and in a case where the lane change function is enabled, the travel control unit is configured to restrict, in response to the estimation unit estimating that the other moving object is present in the specific region, execution of the lane change control, release, in response to a state in which it is estimated that the other moving object is present in the specific region being eliminated after the execution of the lane change control is restricted, restriction placed on the lane change control, and disable the lane change function in response to the state in which it is estimated that the other moving object is present in the specific region continuing for a predetermined time after the execution of the lane change control is restricted.

According to (1), since the lane change function is disabled when the state in which it is estimated that another moving object is present in the specific region continues for a predetermined time, a state in which it is difficult for the control device to determine whether the lane change control is executable may be prevented from continuing for a long time.

(2) The control device according to (1), further including:

a reception unit (HMI 30) configured to receive, from the occupant, an instruction for enabling the lane change function in which the travel control unit enables the lane change function and enables the execution of the lane change control in response to the reception unit receiving the instruction for enabling the lane change function from the occupant after the lane change function is disabled.

According to (2), after the lane change function is disabled, under monitoring of the occupant, the lane change function may be appropriately enabled, and the execution of the lane change control may be enabled. Accordingly, a state in which the lane change control is not executed although the lane change function is enabled is changed to a state in which the lane change control is executable, and a decrease in an execution opportunity of the lane change control may be prevented.

(3) The control device according to (1) or (2), in which, in a case where the lane change function is enabled, when the estimation unit estimates that the other moving object is not present in the specific region on one side in a left-right direction and estimates that the other moving object is present in the specific region on the other side in the left-right direction, the travel control unit is capable of executing the lane change control of performing a lane change to the one side.

According to (3), in a case where it is estimated that another moving object is not present in the specific region on one side in the left-right direction, even if it is estimated that another moving object is present in the specific region on the other side, the lane change control to the one side is executable.

(4) The control device according to (1) or (2), in which the recognition unit recognizes another moving object detected in a detection region (detection region 410) in which the detection accuracy of the external sensor is higher than that in the specific region, and the estimation unit estimates that the other moving object is present in the specific region when the accuracy of detecting the other moving object is decreased as compared with that in the detection region or when the other moving object is no longer detected around the moving object.

According to (4), whether another moving object is present in the specific region may be appropriately estimated based on a detection result of the external sensor detected in advance, and the lane change control may be appropriately restricted.

(5) The control device according to (4), in which, after the execution of the lane change control is restricted in a case where the lane change function is enabled, the travel control unit releases the restriction placed on the lane change control in response to the other moving object estimated to be present in the specific region being detected again in the detection region.

According to (5), since the restriction on the lane change control is quickly released when another moving object estimated to be present in the specific region is detected again in the detection region, an execution opportunity of the lane change control may be increased.

(6) The control device according to (5), in which the recognition unit recognizes identification information for identifying an object detected in the detection region, and the recognition unit recognizes, when the identification information of the object detected in the detection region after the other moving object is estimated to be present in the specific region matches identification information of the other moving object estimated to be present in the specific region, that the object detected in the detection region is the other moving object.

According to (6), whether the other moving object estimated to be present in the specific region moves to the detection region may be appropriately recognized based on the identification information of the other moving object.

What is claimed is:

1. A control device having a lane change function to execute lane change control of changing a lane in which a moving object travels, the moving object including an external sensor configured to detect an object around the moving object, the control device comprising:

a recognition unit configured to recognize a surrounding situation of the moving object based on a detection result of the external sensor;

an estimation unit configured to estimate, based on the surrounding situation recognized by the recognition unit, whether another moving object is present in a specific region in which accuracy of detecting the object by the external sensor is relatively lower as compared with that in other regions;

a travel control unit configured to execute the lane change control based on the surrounding situation recognized by the recognition unit and an estimation result of the estimation unit, wherein the lane change function is switchable to be enabled or disabled in response to an instruction from an occupant of the moving object, the lane change control is executable when the lane change function is enabled, and the lane change control is not executable when the lane change function is disabled, and in a case where the lane change function is enabled, the travel control unit is configured to restrict, in response to the estimation unit estimating that the other moving object is present in the specific region, execution of the lane change control, release, in response to a state in which it is estimated that the other moving object is present in the specific region being eliminated after the execution of the lane change control is restricted, restriction placed on the lane change control, and disable the lane change function in response to the state in which it is estimated that the other moving object is present in the specific region continuing for a predetermined time after the execution of the lane change control is restricted; and a reception unit configured to receive, from the occupant, an instruction for enabling the lane change function, wherein the travel control unit enables the lane change function and enables the execution of the lane change control only in response to the reception unit receiving the instruction for enabling the lane change function from the occupant after the lane change function is disabled, and wherein the recognition unit, the estimation unit, the travel control unit, and the reception unit are each implemented via at least one processor.

2. The control device according to claim 1, wherein, in a case where the lane change function is enabled, when the estimation unit estimates that the other moving object is not present in the specific region on one side in a left-right direction and estimates that the other moving object is present in the specific region on another side in the left-right direction, the travel control unit is capable of executing the lane change control of performing a lane change to the one side.

3. The control device according to claim 1, wherein the recognition unit recognizes another moving object detected in a detection region in which the detection accuracy of the external sensor is higher than that in the specific region, and the estimation unit estimates that the other moving object is present in the specific region when the accuracy of detecting the other moving object is decreased as compared with that in the detection region or when the other moving object is no longer detected around the moving object.

4. The control device according to claim 3, wherein, after the execution of the lane change control is restricted in a case where the lane change function is enabled, the travel control unit releases the restriction placed on the lane change control in response to the other moving object estimated to be present in the specific region being detected again in the detection region.

5. A control device having a lane change function to execute lane change control of changing a lane in which a moving object travels, the moving object including an external sensor configured to detect an object around the moving object, the control device comprising:

a recognition unit configured to recognize a surrounding situation of the moving object based on a detection result of the external sensor;

an estimation unit configured to estimate, based on the surrounding situation recognized by the recognition unit, whether another moving object is present in a specific region in which accuracy of detecting the object by the external sensor is relatively lower as compared with that in other regions; and a travel control unit configured to execute the lane change control based on the surrounding situation recognized by the recognition unit and an estimation result of the estimation unit, wherein the lane change function is switchable to be enabled or disabled in response to an instruction from an occupant of the moving object, the lane change control is executable when the lane change function is enabled, and the lane change control is not executable when the lane change function is disabled, in a case where the lane change function is enabled, the travel control unit is configured to restrict, in response to the estimation unit estimating that the other moving object is present in the specific region, execution of the lane change control, release, in response to a state in which it is estimated that the other moving object is present in the specific region being eliminated after the execution of the lane change control is restricted, restriction placed on the lane change control, and disable the lane change function in response to the state in which it is estimated that the other moving object is present in the specific region continuing for a predetermined time after the execution of the lane change control is restricted, the recognition unit recognizes another moving object detected in a detection region in which the detection accuracy of the external sensor is higher than that in the specific region, the estimation unit estimates that the other moving object is present in the specific region when the accuracy of detecting the other moving object is decreased as compared with that in the detection region or when the other moving object is no longer detected around the moving object, after the execution of the lane change control is restricted in a case where the lane change function is enabled, the travel control unit releases the restriction placed on the lane change control in response to the other moving object estimated to be present in the specific region being detected again in the detection region, the recognition unit recognizes identification information for identifying an object detected in the detection region, the recognition unit recognizes, when the identification information of the object detected in the detection region after the other moving object is estimated to be present in the specific region matches identification information of the other moving object estimated to be present in the specific region, that the object detected in the detection region is the other moving object, and the recognition unit, the estimation unit, the travel control unit, and the reception unit are each implemented via at least one processor.

* * * * *